(12) United States Patent
Kim (10) Patent No.: US 12,496,864 B2
(45) Date of Patent: Dec. 16, 2025

(54) ACCUMULATOR AND VEHICLE SUSPENSION SYSTEM INCLUDING THE SAME (71) Applicant: HL MANDO CORPORATION, Gyeonggi-do (KR)

(72) Inventor: Doobyung Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/656,077

(22) Filed: May 6, 2024

(65) Prior Publication Data
US 2025/0162368 A1 May 22, 2025

(30) Foreign Application Priority Data
Nov. 20, 2023 (KR) .......................... 10-2023-0160651

(51) Int. Cl.
B60G 11/30 (2006.01)

(52) U.S. Cl.
CPC ........ B60G 11/30 (2013.01); *B60G 2202/154* (2013.01); *B60G 2202/24* (2013.01)

(58) Field of Classification Search
CPC .................. B60G 11/265; B60G 11/30; B60G 2202/154; B60G 2202/24; B60G 13/14; F15B 1/04; F15B 1/103; F15B 1/24
See application file for complete search history.

(56) References Cited

U.S. PATENT DOCUMENTS

| | | | | |
|---|---|---|---|---|
| 1,555,199 A * | 9/1925 | Gouirand | ............... | B60G 11/27 267/64.19 |
| 4,858,898 A * | 8/1989 | Niikura | ..................... | F16F 9/43 267/218 |
| 5,052,712 A * | 10/1991 | Raidel | .................... | B60G 15/12 280/124.108 |
| 5,342,023 A * | 8/1994 | Kuriki | ................ | B60G 17/0185 280/5.514 |
| 5,547,211 A * | 8/1996 | Runkel | ................ | B60G 21/073 280/5.506 |
| 5,624,105 A * | 4/1997 | Runkel | ..................... | F15B 1/24 267/64.15 |
| 6,071,096 A * | 6/2000 | Grasl | ...................... | F04B 9/127 417/523 |
| 6,250,658 B1 * | 6/2001 | Sakai | ................... | B60G 21/073 280/124.16 |
| 6,296,091 B1 * | 10/2001 | Hamilton | ............. | B60G 17/018 251/52 |
| 6,648,308 B2 * | 11/2003 | Gunnar Rothoff | .. | B60G 17/044 280/6.159 |

(Continued)

FOREIGN PATENT DOCUMENTS

EP 0425876 A2 * 5/1991
GB 864361 A * 4/1961
JP H02155820 A * 6/1990

*Primary Examiner* — Laura Freedman
(74) *Attorney, Agent, or Firm* — WOMBLE BOND DICKINSON (US) LLP (57) ABSTRACT Accumulator and vehicle suspension system including the same are provided. An accumulator capable of supplying fluid to a suspension system of a vehicle includes a body for storing fluid, a movable portion disposed within the body to form a first space, and a driver for varying a volume of the first space within the movable portion.

15 Claims, 5 Drawing Sheets

(56) References Cited

U.S. PATENT DOCUMENTS

| | | | | |
|---|---|---|---|---|
| 6,805,166 B2 * | 10/2004 | Suzuki | | F15B 1/103 |
| | | | | 220/721 |
| 6,810,915 B2 * | 11/2004 | Umetsu | | F15B 1/103 |
| | | | | 220/721 |
| 6,886,841 B2 * | 5/2005 | Coombs | | F16F 5/00 |
| | | | | 280/124.16 |
| 7,325,571 B2 * | 2/2008 | Shimbori | | F15B 1/106 |
| | | | | 138/30 |
| 7,770,599 B2 * | 8/2010 | Ota | | F15B 1/103 |
| | | | | 220/721 |
| 8,096,324 B2 * | 1/2012 | Nakaoka | | F15B 1/103 |
| | | | | 138/30 |
| 8,448,432 B2 * | 5/2013 | Bresie | | F15B 7/006 |
| | | | | 92/113 |
| 8,776,961 B2 * | 7/2014 | Mori | | B60G 17/08 |
| | | | | 188/266.2 |
| 9,388,830 B2 * | 7/2016 | Mizukami | | F15B 1/103 |
| 10,421,330 B2 * | 9/2019 | Jeong | | B60G 17/019 |
| 11,313,516 B2 * | 4/2022 | Kurdziel | | F17C 3/00 |
| 11,679,820 B2 * | 6/2023 | Streit | | B60G 99/002 |
| | | | | 280/124.106 |
| 12,117,024 B2 * | 10/2024 | Tucker | | F15B 13/027 |
| 12,188,540 B2 * | 1/2025 | Vochten | | F16F 9/082 |
| 2012/0074625 A1 * | 3/2012 | Lee | | B60G 15/14 |
| | | | | 267/64.26 |
| 2012/0160621 A1 * | 6/2012 | Battlogg | | B60G 17/08 |
| | | | | 188/267.2 |
| 2019/0077210 A1 * | 3/2019 | Moroni | | B60G 17/0424 |
| 2021/0354523 A1 * | 11/2021 | Hirao | | B60G 17/06 |
| 2024/0051367 A1 * | 2/2024 | Wegner | | B60G 17/0408 |
| 2024/0317007 A1 * | 9/2024 | Henderickx | | B60G 13/08 |
| 2025/0162372 A1 * | 5/2025 | Kim | | B60G 17/0152 |

* cited by examiner

ACCUMULATOR AND VEHICLE SUSPENSION SYSTEM INCLUDING THE SAME

CROSS-REFERENCE TO RELATED APPLICATIONS

This application claims benefit and priority to Korean Patent Application No. 10-2023-0160651, filed on Nov. 20, 2023, with the Korean Intellectual Property Office, the disclosure of which is incorporated herein in its entirety by reference.

TECHNICAL FIELD

The present disclosure relates to an accumulator and to a vehicle suspension system including the same, and more particularly to an accumulator capable of quickly responding to regulate a damping force of a damper and a vehicle suspension system including the same.

BACKGROUND

In general, the piston of a damper is moved by the pressure of the fluid inside, improving the ride comfort of the vehicle. The direction of the hydraulic oil supplied to the damper is regulated to move the piston, thereby regulating the damping force inside. Specifically, hydraulic fluid is supplied to a compression chamber or rebound chamber to move the piston, thereby regulating the damping force.

However, uneven ground conditions, such as those encountered on roads, can cause discomfort or shocks for drivers and passengers, especially at higher speeds.

Such uneven ground conditions may cause discomfort or shocks for drivers and passengers, especially at higher speeds.

In addition, various vehicle specifications require different pump capacities to adjust the damping force. In other words, a larger capacity pump requires a larger pump size, resulting in a larger footprint inside the vehicle and limiting installation flexibility.

SUMMARY

The present disclosure provides an accumulator for regulating a damping force of a damper by varying a volume of a passage through which pressurized oil feeding the damper passes, and a suspension system of a vehicle including the accumulator.

In one general aspect, there is provided an accumulator capable of supplying fluid to a suspension system of a vehicle, and the accumulator includes: a body configured to store fluid; a moving portion disposed within the body to form a first space; and a driver for varying a volume of the first space.

Further, the accumulator may further include: a moving portion at least partially disposed in the body and movable by the driver; and a connecting portion disposed between the moving portion and the variable portion.

Further, the accumulator as described above may further comprise a sealing portion disposed between the body and the moving portion to maintain sealing within the body.

Further, the accumulator described above may further comprise a volume detector configured to detect a state of movement of the moving portion.

Further, the accumulator as described above may further comprise a stopper disposed within the first space to form a second space.

Further, the variable portion may be formed of a variable material.

In another aspect of the present disclosure, there is provided a suspension system of a vehicle, and the system includes: a damper comprising a first chamber, a second chamber, and a piston dividing between the first chamber and the second chamber; a pump for supplying pressurized oil to the damper; and an accumulator capable of supplying stored fluid to the damper.

Further, the accumulator may comprise an adjustment module capable of adjusting an internal volume.

Further, the adjustment module may comprise: a variable portion forming a first space where fluid is stored; a driver for varying a volume of the first space within the variable portion; a moving portion at least partially inserted in the accumulator and movable by the driver; and a connecting portion disposed between the moving portion and the variable portion.

Further, the suspension system may further include: an environmental detector configured to detect driving environment information of the vehicle; and a controller configured to control a volume of the pump or a volume of the accumulator based on the information detected by the environmental detector.

Furthermore, the controller may control at least one of the volume of the accumulator or the volume of the pump based on the information detected by the environmental detector.

Further, the controller may regulate a damping force of the damper by supplying pressurized oil to the first chamber or the second chamber based on the information detected by the environmental detector.

Furthermore, the controller may regulate a position of the piston by varying the volume of the accumulator based on the information detected by the environmental detector.

In yet another aspect, there is provided a suspension system of a vehicle, and the system includes: a damper comprising a first chamber, a second chamber, and a piston dividing between the first chamber and the second chamber; an accumulator capable of supplying stored fluid to the damper; an environmental detector configured to detect driving environment information of the vehicle; and a controller configured to supply the stored fluid to the first chamber or the second chamber by varying a volume of the accumulator based on the information detected by the environmental detector.

Further, the accumulator may comprise an adjustment module comprising: a variable portion forming a first space where fluid is stored; and a driver for varying a volume of the first space within the variable portion and controlled by the controller.

Further, the suspension system may further include a pump for supplying pressurized oil to the damper.

Further, the controller may be capable of controlling the driver to increase the pressure of the pressurized oil supplied to the damper.

Further, the controller may operate the pump based on the information detected by the environmental detector, and then control the driver.

Furthermore, the driving environment information of the vehicle detected by the environmental detector may be ground condition information regarding a direction of travel of the vehicle.

Further, the suspension system may further include a volume detector configured to detect a change in the volume of the accumulator and transmit the detected change to the controller.

According to embodiments of the present disclosure, an accumulator and a suspension system of a vehicle including the accumulator may adjust a volume of a passage provided to a damper to adjust pressure, thereby regulating a damping force of the damper with quick responsiveness.

In addition, the accumulator and the suspension may quickly control the damping force of the damper based on driving environment information of the vehicle, thereby improving the comfort of drivers and passengers.

Furthermore, the size and footprint of the pump may be increased by a volume-variable accumulator.

DETAILED DESCRIPTION

Hereinafter, the present disclosure will be described more fully with reference to the accompanying drawings, in which exemplary embodiments of the present disclosure are shown. The present disclosure may be implemented in various ways and is not limited to the embodiments described herein.

It should be understood that the drawings are schematically illustrated but are not illustrated according to the exact scales. In addition, the relative size and ratio of each configuration shown in the drawings are arbitrarily illustrated for understanding and ease of description, and the thickness of layers, films, panels, regions, etc. are exaggerated or reduced for clarity. The arbitrary size is not restrictive but illustrative only. Further, the same reference numerals may denote the same structures, elements, or components shown in at least two drawings in order to represent corresponding or similar characteristics.

Exemplary embodiments of the present disclosure illustrate ideal exemplary embodiments in more detail. As a result, various modifications of the drawings are expected. Therefore, the exemplary embodiments are not limited to specific forms in regions illustrated in the drawings, and for example, include modifications of forms due to manufacturing.

Figure 1:
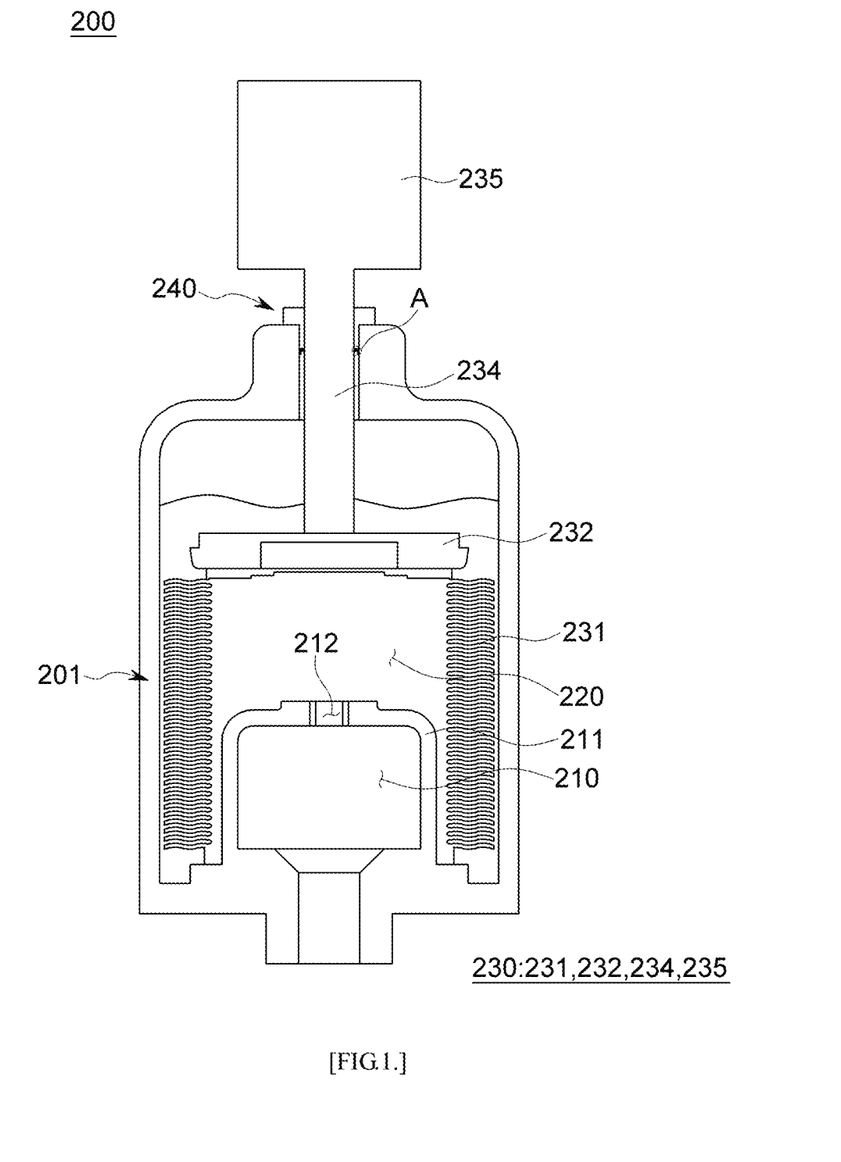
FIG. 1 is a view showing the interior of an accumulator according to one embodiment of the present disclosure.
Figure 2:
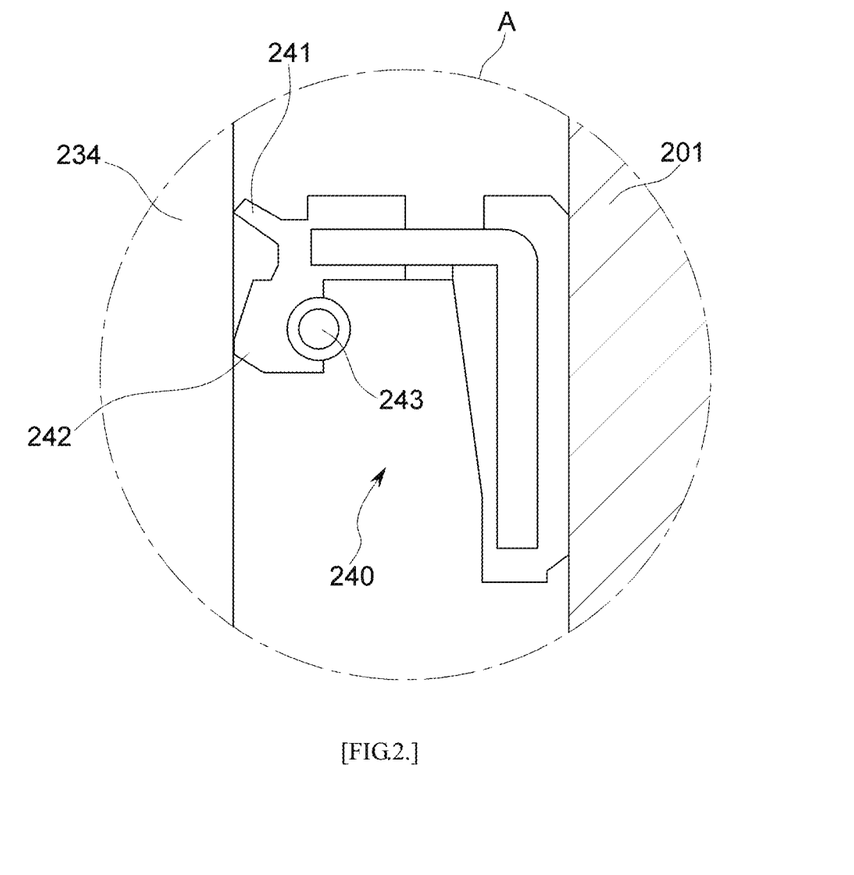
FIG. 2 is an enlarged view of a portion A of FIG. 1.
Figure 5:
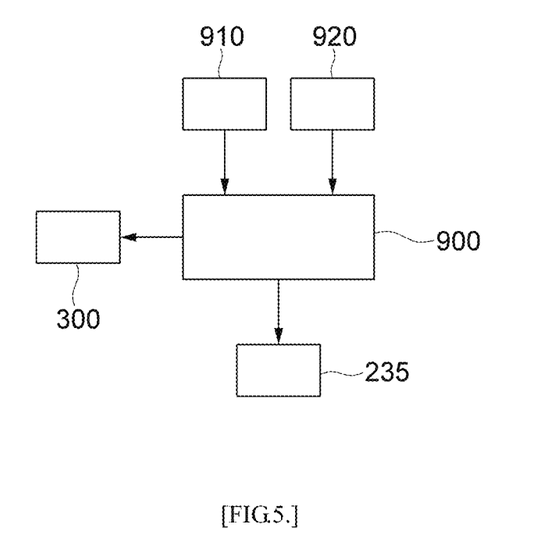
FIG. 5 illustrates a block diagram of a suspension system of a vehicle according to one embodiment of the present disclosure.

Referring now to FIGS. 1 and 2 and FIG. 5, an accumulator 200 according to one embodiment of the present disclosure will be described.

The accumulator 200 according to one embodiment of the present disclosure includes a body 201, a variable portion 231, and a driver 235, as shown in FIG. 1.

The body 201 is formed to be hollow inside. In addition, the body 201 has a fluid stored therein. Specifically, the body 201 forms the exterior and has a fluid stored therein.

The variable portion 231 is disposed within the body 201 to form a first space 220. Specifically, the variable portion 231 is disposed within the body 201 to form the first space 220 in which fluid can be stored. A space outside the variable portion 231 within the body 201 may store compressible oil or compressible gas.

The driver 235 varies a volume of the first space 220 within the variable portion 231. Specifically, the driver 235 provides power for movement of the variable portion 231. Thus, the internal volume of the first space 220 may be variable in response to movement of the variable portion 231.

For example, the driver 235 may be a motor.

Due to this configuration, in the accumulator 200 according to one embodiment of the present disclosure, the volume of the first space 220 may be varied by the driver 235 to supply fluid stored in the accumulator 200 to a suspension system 101 of the vehicle.

Thus, the accumulator 200 may provide fluid as needed by the suspension system 101, aiding the suspension system 101 in regulating the damping force.

Further, the accumulator 200 according to one embodiment of the present disclosure may further include a moving portion 234 and a connecting portion 232.

The moving portion 234 may be disposed at least partially within the body 201 and movable by the driver 235. Specifically, the moving portion 234 may be disposed within the body 201 on one side to be moved along a longitudinal direction of the body 201 by power provided by the driver 235.

The connecting portion 232 may be disposed between the moving portion 234 and the variable portion 231. Specifically, the connecting portion 232 may connect the moving portion 234 and the variable portion 231 to each other, so that the variable portion 231 varies the volume of the first space 220 in response to movement of the moving portion 234. That is, the connecting portion 232 may allow the variable portion 231 to move together with the moving portion 234 moving in a direction to be inserted into the body 201, thereby reducing the volume of the first space 220. Alternatively, the connecting portion 232 may allow the variable portion 231 to move together with the moving portion 234 moving out of the body 201, thereby increasing the volume of the first space 220.

For example, the moving portion 234 and the connecting portion 232 may be manufactured together or separately.

In addition, the accumulator 200 according to one embodiment of the present disclosure may further include a sealing portion 240, as shown in FIG. 1.

The sealing portion 240 may be disposed between the body 201 and the moving portion 234 to maintain an airtight seal within the body 201. In addition, the sealing portion 240 may be disposed between an inner circumferential surface of the body 201 and an outer circumferential surface of the moving portion 234 to maintain the airtight seal of gas and liquid inside the body 201 when the moving portion 234 moves along the longitudinal direction of the body 201.

As shown in FIG. 2, the sealing portion 240 may further include a first lip 241, a second lip 242, and a garter spring 234.

As shown in FIG. 2, the sealing portion 240 may further include a first lip 241, a second lip 242, and a garter spring 243.

The garter spring 243 may compress the outer side of the second lip 242, allowing the sealing portion 240 to compress the moving portion 234 in order to maintain the airtight seal.

In addition, the accumulator 200 according to one embodiment of the present disclosure may further include a volume detector 920, as shown in FIG. 5.

The volume detector 920 may detect a state of movement of the moving portion 234. Specifically, the volume detector 920 may detect a change in volume of the first space 220 that varies with movement of the first portion 234.

For example, the volume detector 920 may detect a change in volume of the first space 220 based on a distance traveled by the moving portion 234.

The volume detector 920 may be a height sensor supported on the body 201 to detect a distance traveled by the moving portion 234.

Further, the accumulator 200 according to one embodiment of the present disclosure may further include a stopper 211, as shown in FIG. 1.

The stopper 211 may be disposed within the first space 220. In addition, the stopper 211 may form a second space 210 therein. Specifically, the stopper 211 may be formed with a communication hole 212 communicating with the first space 220, and may protrude in a direction toward the connecting portion 232 in an area relatively distant from the area supporting the movable portion 234 inside the body 201. In other words, the second space 210 may be formed to have a relatively smaller volume than that of the first space 220.

Also, the second space 210 may be formed inside the stopper 211. The second space 210 and the first space 220 may have fluid flow therethrough via the communication hole 212.

Thus, the stopper 211 may restrict the movement of the connecting portion 232 to maintain a minimum volume of the accumulator 200 while the variable portion 231 moves.

That is, the movement of the connecting portion 232 may be restricted by the contact of the connecting portion 232 with the stopper 211 as the connecting portion 232 is moved by power transmitted by the driver 235.

In addition, in the accumulator 200 according to one embodiment of the present disclosure, the variable portion 231 may be formed of a variable material.

The variable portion 231 may be formed of a bellows-type variable material, thereby expanding and contracting in response to power provided by the driver 235 and forming the first space 220.

With this configuration, the accumulator 200 according to one embodiment of the present disclosure may variably form the first space 220 where fluid is stored, in response to power provided by the driver 235, thus selectively supplying the fluid stored in the first space to an outside.

In addition, with reference to FIGS. 1 through 5, the suspension system 101 according to one embodiment of the present disclosure will be described.

Figure 3:
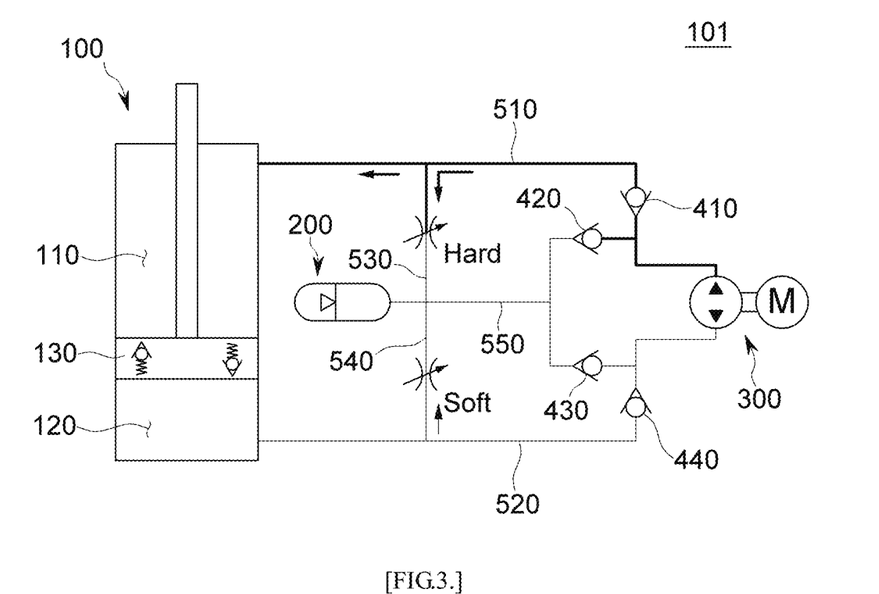
FIGS. 3 and 4 are views showing the operation of a suspension system of a vehicle according to one embodiment of the present disclosure.

The suspension system 101 of the present disclosure includes a damper 100, a pump 300, and an accumulator 200, as shown in FIGS. 2 and 3.

The damper 100 includes a first chamber 110, a second chamber 120, and a piston 130. The piston 130 may selectively divide between the first chamber 110 and the second chamber 120. That is, the piston 130 may be disposed between the first chamber 110 and the second chamber 120 within the damper 100. The piston 130 may vary the internal volume of the first chamber 110 and the second chamber 120.

For example, the first chamber 110 may be a rebound chamber, and the second chamber 120 may be a compression chamber.

The pump 300 may supply pressurized oil to the damper 100. Specifically, the pump 300 may supply pressurized oil to the damper 100 to adjust a damping force of the damper 100. That is, the piston 130 may be moved in a direction to pressurize the first chamber 110 by pressurized oil supplied by the pump 300, or may be moved in a direction to pressurize the second chamber 120.

The accumulator 200 may store fluid therein and supply the fluid to the damper 100. Specifically, the accumulator 200 may store pressurized fluid therein to be supplied to the damper 100, and may additionally supply pressurized fluid to the damper 100 as needed to further regulate the damping force.

Thus, the suspension system 101 according to one embodiment of the present disclosure may regulate the damping force of the suspension system 101 by supplying the fluid stored in the accumulator 200 to the damper 100.

In addition, the accumulator 200 according to one embodiment of the present disclosure may include an adjustment module 230, as shown in FIG. 1.

The adjustment module 230 may adjust the internal volume of the accumulator 200. The adjustment module 230 may regulate the volume of fluid stored in the body 201. That is, the accumulator 200 may include the adjustment module 230 capable of regulating the internal volume where the fluid is stored.

The adjustment module 230 may include a variable portion 231, a driver 235, a moving portion 234, and a connecting portion 232. Specifically, the accumulator 200 included in the suspension system 101 according to one embodiment of the present disclosure includes may be the same as the accumulator 200 described above.

In addition, the suspension system 101 according to one embodiment of the present disclosure may further include an environmental detector 910 and a controller 900, as shown in FIG. 5.

The environmental detector 910 may detect driving environment information of the vehicle. Specifically, the environmental detector 910 may detect a ground condition in a direction of travel of the vehicle and transmit the detected ground condition to the controller 900.

For example, the environmental detector 910 may be a camera.

The controller 900 may control a volume of the pump 300 or the accumulator 200 based on information detected by the environmental detector 910. Specifically, the controller 900 may regulate the damping force of the damper 100 by controlling the pump 300 or the volume of the accumulator 200 based on information detected by the environmental detector 910. In other words, the controller 900 may regulate the damping force of the damper 100 by controlling the pump 300 or the accumulator 200 based on a ground condition in the direction of travel of the vehicle.

In addition, the controller 900 according to one embodiment of the present disclosure may regulate the damping force of the damper 100 by controlling at least one of the volume of the accumulator 200 or the volume of the pump 300.

The controller 900 may regulate the damping force of the damper 100 by controlling one or more of the volume of the accumulator 200 or the volume of the pump 300 based on information detected by the environmental detector 910.

In addition, the controller 900 according to one embodiment of the present disclosure may regulate the damping force of the damper 100 by supplying pressurized oil to the first chamber 110 or the second chamber 120 based on information detected by the environmental detector 910.

Based on information detected by the environmental detector 910, the controller 900 may supply pressurized oil from the pump 300 or pressurized oil stored in the accumulator 200 to the first chamber 110, or may supply pressurized oil from the pump 300 or pressurized oil stored in the accumulator 200 to the second chamber 120.

In addition, the controller 900 according to one embodiment of the present disclosure may adjust a position of the piston 130 by varying the volume of the accumulator 200 based on information detected by the environmental detector 910.

The controller 900 may further regulate the damping force of the damper 100 by adjusting the position of the piston 130 by varying the volume of the accumulator 200.

Figure 4:
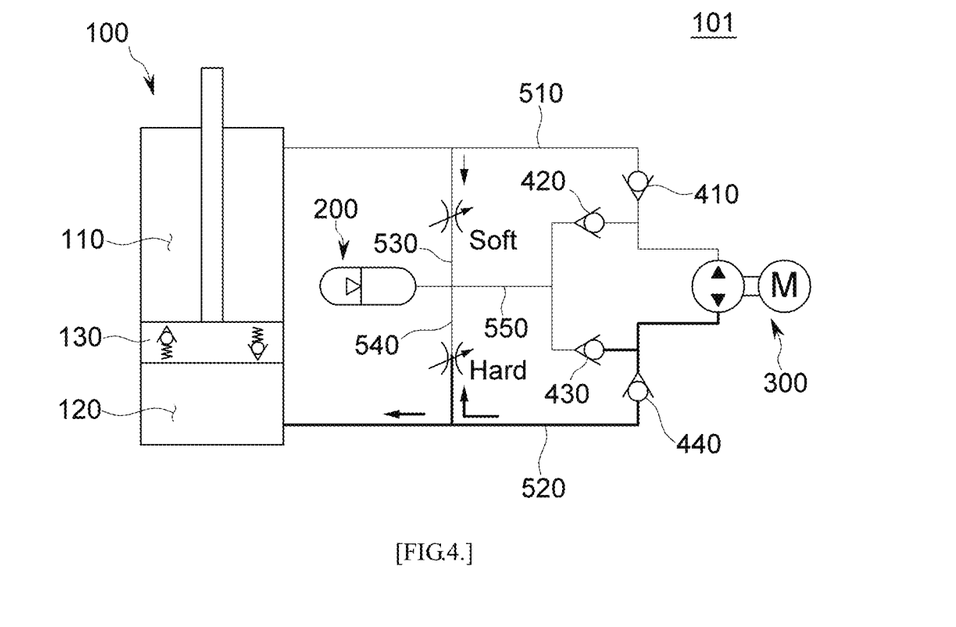

In addition, the suspension system 101 according to one embodiment of the present disclosure may include a rebound line 510 and a compression line 520, a first auxiliary line 530, a second auxiliary line 540, a main line 550, and a plurality of check valves 410, 420, 430, and 440, as shown in FIGS. 3 and 4.

The rebound line 510 may connect the first chamber 110 and the pump 300.

The compression line 520 may connect the second chamber 120 and the pump 300.

A first check valve 410 may be disposed on the rebound line 510 to prevent pressurized oil passing through the rebound line 510 from flowing back into the pump 300.

A second check valve 440 may be disposed on the compression line 520 to prevent pressurized oil passing through the compression line 520 from flowing back into the pump 300.

The first auxiliary line 530 may connect the accumulator 200 and the rebound line 510.

The second auxiliary line 540 may connect the accumulator 200 and the compression line 510.

Specifically, pressurized oil may be fed to the accumulator 200 via the first and second auxiliary lines 530 and 540. The first and second auxiliary lines 530 and 540 may be provided with throttle valves.

One side of the main line 550 may be connected to the accumulator 200, and the other side may be branched to connect to the rebound line 510 and the compression line 520.

A third check valve 420 and a fourth check valve 430 may be installed at ends of the other side of the main line 550 to prevent fluid passing through the main line 550 from flowing back into the accumulator 200.

Thus, the suspension system 101 according to one embodiment of the present disclosure may regulate the damping force of the damper 100 by the accumulator 200 as well as the pump 300. Accordingly, a driver and passengers in the vehicle may experience stable ride comfort provided by the suspension system 101 in response to changes in the ground conditions as the vehicle travels.

Hereinafter, with reference to FIGS. 1 through 5, the operation of the suspension system 101 according to one embodiment of the present disclosure will be described.

The environmental detector 910 detects driving environment information of the vehicle and transmits the detected driving environment information to the controller 900. The controller 900 regulates the damping force of the damper 100 based on ground condition information regarding a direction of travel of the vehicle, the information detected by the environmental detector 910. Specifically, the controller 900 has a preset damping force, which is required based on the ground condition information and the presence of passengers in the vehicle.

When the environmental detector 910 detects the presence of an obstacle, such as a bump, the controller 900 operates the pump 300 to rotate in one direction, as shown in FIG. 3. The controller 900 performs a control to supply pressurized oil from the pump 300 to the first chamber 110. That is, the controller 900 may move the piston 130 in a direction to reduce the volume of the second chamber 120.

The controller 900 may vary the volume of the first space 220 of the accumulator 200 by controlling the adjustment module 230 based on information detected by the environmental detector 910 regarding the condition of an additional obstacle and the presence or absence thereof.

In addition, in a case where the information detected by the environmental detector 910 indicates the presence of an additional protruding obstacle, such as a bump, after the current operation of the pump 300 in one direction, the controller 900 may operate the driver 235 to move the piston 130 in a direction where the volume of the first space 220 decreases. In this case, the reduced volume of the first space 220 may lead to a reduced volume of the overall passage to the damper 100, thereby increasing the pressure.

That is, the controller 900 may cause the pressurized oil stored in the first space 220 of the accumulator 200 to be further supplied to the first chamber 110, thereby causing the piston 130 to be further moved accordingly.

Thus, the controller 900 may operate the driver 235 to further regulate the damping force of the damper 100. An amount of the pressurized oil supplied to the first chamber 110 or a volume of the overall passage may be regulated by the driver 235 that is controlled by the controller 900. That is, even if there is a small additional obstacle encountered while traversing a large bump, the controller 900 may regulate the damping force of the damper 100 by controlling the driver 235 of the accumulator 200. Thus, the suspension system 101 may also quickly regulate the damping force of the damper 100 in response to the additional obstacle located on the bump.

In this case, the controller 900 may detect a state of movement of the moving portion 234 and a volume of the first space 220 using the volume detector 920.

Alternatively, in a case where the information detected by the environmental detector 910 indicates the presence of a depression in an obstacle such as a speed bump, after the current operation of pump 300 in one direction, the controller 900 may operate the driver 235 to move the piston 130 in a direction where the volume of the first space 220 increases.

Accordingly, due to the change in the internal volume of the accumulator 200, the piston 130 within the damper 110 may move finely, regulating the damping force of the damper 100.

Alternatively, if the environmental detector 910 detects the presence of an obstacle, such as a rut, in the ground, the controller 900 operates the pump 300 to rotate in the opposite direction, as shown in FIG. 4. The controller 900 causes the pressurized oil from the pump 300 to be supplied to the second chamber 120. That is, the controller 900 may move the piston 130 in a direction to reduce the volume of the first chamber 110.

In addition, in a case where the information detected by the environmental detector 910 indicates the presence of an additional deeper depression, after the current operation of the pump 300 in the opposite direction, the controller 900 may operate the driver 235 to move the piston 130 in a direction where the volume of the first space 220 decreases.

Alternatively, in a case where the information detected by the environmental detector 910 indicates the presence of a protruding obstacle in a rut on the ground, after the current operation of the pump 300 in the opposite direction, the controller 900 may operate the driver 235 to move the piston 130 in a direction where the volume of the first space 220 decreases.

Accordingly, due to the change in the internal volume of the accumulator 200, the piston 130 within the damper 110 may move finely, regulating the damping force of the damper 100.

Thus, the suspension system 101 according to one embodiment of the present disclosure may improve the responsiveness of the damping force regulation of the damper 100 by controlling the volume of the accumulator 200 or the pump 300.

In addition, the suspension system 101 may improve ride comfort by finely adjusting the piston 130 of the damper 100 by controlling the volume of the accumulator 200 based on the presence or absence of an obstacle on a road surface, without the need for additional complex configurations.

Furthermore, since the suspension system 101 includes the volume-variable accumulator 200, it is possible to regulate the damping force according to the vehicle's specifications. Consequently, the capacity of the pump 300 required for the suspension system 101 may be reduced, thereby extending the lifespan of the pump 300.

The exemplary embodiments of the present disclosure have been described with reference to the accompanying drawings, but those skilled in the art will understand that the present disclosure may be implemented in other specific forms without changing the technical spirit or an essential feature thereof.

Accordingly, it will be understood that the aforementioned exemplary embodiments are described for illustration in all aspects and are not limited, and it will be construed that the scope of the present disclosure is represented by the claims to be described below, and all of the changes or modified forms induced from the meaning and the scope of the claims, and an equivalent concept thereof are included in the scope of the present disclosure.

What is claimed is:

1. An accumulator capable of supplying fluid to a suspension system of a vehicle, the accumulator comprising:
   a body configured to store fluid;
   a variable portion disposed within the body to form a first space;
   a driver for varying a volume of the first space;
   a moving portion at least partially disposed in the body and movable by the driver;
   a connecting portion disposed between the moving portion and the variable portion; and
   a stopper disposed within the first space to form a second space, wherein the stopper protrudes from a bottom of the body in a direction adjacent to a top of the body and having a communication hole formed to flow the fluid through between the first space and the second space,
   wherein the connecting portion has a concave portion configured to receive a part of the stopper where the communication hole of the stopper is formed.

2. The accumulator of claim 1, further comprising:
   a sealing portion disposed between the body and the moving portion to maintain sealing within the body.

3. The accumulator of claim 1, further comprising:
   a volume detector configured to detect a state of movement of the moving portion.

4. The accumulator of claim 1, wherein the variable portion is formed of a variable material.

5. A suspension system of a vehicle, the suspension system comprising:
   a damper comprising a first chamber, a second chamber, and a piston dividing between the first chamber and the second chamber;
   a pump for supplying pressurized oil to the damper; and
   an accumulator capable of supplying stored fluid to the damper,
   wherein the accumulator comprises:
   a body configured to store fluid;
   a variable portion disposed within the body to form a first space;
   a driver for varying a volume of the first space;
   a moving portion at least partially inserted in the accumulator and movable by the driver;
   a connecting portion disposed between the moving portion and the variable portion; and
   a stopper disposed within the first space to form a second space, wherein the stopper protrudes from a bottom of the body in a direction adjacent to a top of the body and having a communication hole formed to flow the fluid through between the first space and the second space,
   wherein the connecting portion has a concave portion configured to receive a part of the stopper where the communication hole of the stopper is formed.

6. The suspension system of claim 5, further comprising:
   an environmental detector configured to detect driving environment information of the vehicle; and
   a controller configured to control a volume of the pump or a volume of the accumulator based on the information detected by the environmental detector.

7. The suspension system of claim 6, wherein the controller controls at least one of the volume of the accumulator or the volume of the pump based on the information detected by the environmental detector.

8. The suspension system of claim 6, wherein the controller regulates a damping force of the damper by supplying pressurized oil to the first chamber or the second chamber based on the information detected by the environmental detector.

9. The suspension system of claim 6, wherein the controller regulates a position of the piston by varying the volume of the accumulator based on the information detected by the environmental detector.

10. A suspension system of a vehicle, the suspension system comprising:
    a damper comprising a first chamber, a second chamber, and a piston dividing between the first chamber and the second chamber;
    an accumulator capable of supplying stored fluid to the damper;
    an environmental detector configured to detect driving environment information of the vehicle; and
    a controller configured to supply the stored fluid to the first chamber or the second chamber by varying a volume of the accumulator based on the information detected by the environmental detector,
    wherein the accumulator comprises an adjustment module comprising:
    a body configured to store fluid;
    a variable portion within the body to form a first space;
    a driver for varying a volume of the first space within the variable portion and controlled by the controller;
    a moving portion at least partially disposed in the body and movable by the driver;
    a connecting portion disposed between the moving portion and the variable portion; and a stopper within the first space to maintain a minimum volume of the accumulator,
wherein the stopper protrudes from a bottom of the body in a direction adjacent to a top of the body and having a communication hole formed to flow the fluid through between the first space and inside the of the stopper,
wherein the connecting portion has a concave portion configured to receive a part of the stopper where the communication hole is formed.

11. The suspension system of claim 10, further comprising:
a pump for supplying pressurized oil to the damper.

12. The suspension system of claim 11, wherein the controller is capable of controlling the driver to increase a pressure of the pressurized oil supplied to the damper.

13. The suspension system of claim 11, wherein the controller operates the pump based on the information detected by the environmental detector, and then controls the driver.

14. The suspension system of claim 10, wherein the driving environment information of the vehicle detected by the environmental detector is ground condition information regarding a direction of travel of the vehicle.

15. The suspension system of claim 10, further comprising:
a volume detector configured to detect a change in the volume of the accumulator and transmit the detected change to the controller.

* * * * *